(12) United States Patent
Chhabra

(10) Patent No.: US 10,797,615 B2
(45) Date of Patent: Oct. 6, 2020

(54) UNCERTAINTY BASED CONTROLLER DESIGN FOR AN INVERTER

(71) Applicant: Mohit Chhabra, Glenview, IL (US)

(72) Inventor: Mohit Chhabra, Glenview, IL (US)

(73) Assignee: Mohit Chhabra, Wheeling, IL (US)

( * ) Notice: Subject to any disclaimer, the term of this patent is extended or adjusted under 35 U.S.C. 154(b) by 144 days.

(21) Appl. No.: 15/898,631

(22) Filed: Feb. 18, 2018

(65) Prior Publication Data
US 2019/0260311 A1 Aug. 22, 2019

(51) Int. Cl.
*H02M 7/5387* (2007.01)
*H02M 1/42* (2007.01)
*H02J 3/38* (2006.01)
*H02M 1/12* (2006.01)

(52) U.S. Cl.
CPC ......... *H02M 7/53871* (2013.01); *H02J 3/383* (2013.01); *H02M 1/126* (2013.01); *H02M 1/42* (2013.01); *H02J 2203/20* (2020.01)

(58) Field of Classification Search
CPC .... H02M 7/53871; H02M 1/126; H02M 1/42; H02J 3/383; H02J 2003/007
See application file for complete search history.

(56) References Cited

U.S. PATENT DOCUMENTS

| | | | | |
|---|---|---|---|---|
| 6,380,719 B2* | 4/2002 | Underwood | ............. | H02J 3/38 307/85 |
| 6,775,610 B2* | 8/2004 | Akiyama | ............ | G01M 15/044 701/110 |
| 9,331,561 B2* | 5/2016 | Kolar | ........................ | H02J 3/01 |
| 9,450,513 B2* | 9/2016 | Ohori | ...................... | H02M 7/44 |
| 9,490,724 B2* | 11/2016 | Balocco | ................. | H02M 7/04 |
| 10,110,010 B2* | 10/2018 | Lucas | ..................... | H02J 3/381 |
| 10,211,640 B2* | 2/2019 | Dent | ...................... | H02J 3/383 |
| 10,439,511 B2* | 10/2019 | Wang | ................. | H02M 7/5395 |
| 2018/0076630 A1* | 3/2018 | Ren | ....................... | H02M 7/493 |

* cited by examiner

Primary Examiner — Michael C Zarroli

(57) ABSTRACT

A design method for the current controller of a grid connected inverter is discussed in this disclosure. The repetitive control strategy is used, in tandem with a mu-synthesis based current controller, to attain sinusoidal reference tracking and harmonic rejection. Mu-synthesis based control is chosen to attain reference tracking in the presence of plant uncertainties. The repetitive control strategy is selected since it can reject a large number of harmonics simultaneously, while providing a clean sinusoidal current waveform to the grid, even in the presence of grid load and/or voltage distortions. The repetitive control strategy is implemented via the internal model principle. By applying mu-synthesis principles, a feedback controller that simultaneously achieves stability and tracking performance is obtained.

3 Claims, 6 Drawing Sheets

UNCERTAINTY BASED CONTROLLER DESIGN FOR AN INVERTER

FIELD OF THE INVENTION

The present invention relates to a method for design of a controller for an inverter, more particularly, a method to design the current controller for a grid connected inverter.

BACKGROUND INFORMATION

The present disclosure refers to ten documents identified in the References section. Each of these documents is identified herein by the numerical assigned to them in the References section. For inverter systems, current control solutions yielding overall stability, fast transient response, and decoupled control of real and reactive power are desired. Existing work in this area comes from document [1] that discusses a line-interactive inverter control technique which allows a certain output power factor setting. Similarly, document [2] discusses an inverter control method that allows line-interactive inverter control settings in grid connected mode. However, neither of these methods has closed loop control to compensate, for disturbances in the inverter DC voltage, or disturbances in the inverter AC voltage, or provide robust current tracking. Document [3] studies current control techniques for three-phase inverters; particularly the use of a proportional-integral based current control, and the subsequent need for axis decoupling. Document [4] presents a power control method for a grid connected inverter where the output voltage is controlled; however, this approach requires an interface inductor to be connected between the output terminal and the grid, whose inductance value is assumed to be known. The existence of the interface inductor forces greater voltage magnitude and phase change at the output terminal to meet certain regulations of the utility. Since knowledge of the value of power system equivalent impedance is not available in practical applications, if this inductor is removed, the approach becomes invalid. Even though the error in the power factor angle of the impedance has been considered, it is the magnitude of the impedance that truly causes the sensitivity of responses, which is however not addressed in [4]. Document [5] discusses the use of optimal control design methodology to devise the current controller for a grid tied inverter. By using optimal control design, a current controller can be designed without accounting for uncertainties. Then the inverter's closed loop stability robustness in the presence of uncertainties can be measured. However, optimal control design does not account for, or measure, performance robustness in the presence of uncertainties.

BACKGROUND OF THE INVENTION

Control of the power output of inverter based distributed systems is of great interest to electric utilities, system owners, operators, and researchers, to be able to improve grid characteristics and provide fault ride through. For a grid connected inverter, its output power is calculated as a product of its output voltage and output current. The grid side voltage serves as a reference for the inverter's output voltage. Therefore, the inverter's output power can be controlled by controlling its output current. In this disclosure a method for the design of the current controller for a grid connected inverter is discussed. A current controller is designed to drive the error between the output current of an inverter, and a given reference current, to zero. Desired phase and gain margins are specified and used during the design process. However, the design process requires the assumption that certain metrics, such as inverter DC voltage, grid side voltage, and AC filter parameters are fixed in value. Excessive fluctuation in any of these metrics can impair the performance of the previously designed current controller. The mu-synthesis design method discussed in this disclosure lets the designer specify which metrics are expected to fluctuate, and by how much, from their nominal value. This expected fluctuation will be termed as uncertainty hereon. The design method will be termed as mu-synthesis from hereon.

Robust control offers a powerful tool, namely mu-synthesis, to design a controller with uncertainties accounted for in the design process. Principle ideas in mu-synthesis rely on selecting suitable weighting functions to reflect the desired robustness and then performing controller optimisation over all possible perturbations. The features of this approach include capabilities in modelling both static and frequency-dependent uncertainties. One shortcoming of the optimal control design method is that although it can measure closed loop stability robustness, it cannot account for, or measure performance robustness. Document [6] has shown that tracking performance robustness is not achieved under prescribed fluctuations in input DC voltage when using an optimal control based current controller. Mu-synthesis approach was first proposed by document [7] in 1982, and can be used to evaluate the effect of both structured and unstructured uncertainties on closed loop system performance. In mu-synthesis, controller design is based on the notion of structured singular value.

SUMMARY OF THE INVENTION

For the purposes of this disclosure, mu-synthesis control design methodology is used to design the current controller for a grid connected three phase inverter. Uncertainty in the inverter DC voltage is considered. An inverter may experience fluctuations in the input DC voltage due to varying DC current levels, phase faults, or ground faults. An inverter is designed to disconnect from service in case its DC voltage strays outside a narrow pre-defined operating range. With a current controller that's designed to be robust to the worst-case uncertainty in the input DC voltage, the inverter's operating range can be widened, leading to increased flexibility when using such an inverter. The resulting closed loop system benefits from the robust stability characteristics of optimal control design, and robust performance characteristics of robust control design.

By using mu-synthesis, a measure of closed loop stability and closed loop performance can be derived for the inverter. Both these metrics are useful for the designer to estimate what the operating range should be for the DC voltage.

The objects and advantages of the present invention will be more apparent upon reading the following detailed description and accompanying drawings.

DETAILED DESCRIPTION OF THE INVENTION

The following is a detailed description of the aforementioned drawings, and illustrative embodiments of the present invention. As these embodiments of the present invention are described with reference to the aforementioned drawings, it is understood that variations, combinations, equivalents of the specific embodiment, method, and examples described may become apparent to those skilled in the art. All such variations, combinations, equivalents of the specific embodiment, method, and examples that rely upon the teachings of the present invention, and through which these teachings have advanced the art, are considered to be within the spirit and scope of the present invention.

1. Mu-Synthesis Control Theory

Mu-synthesis approach was first proposed by document [7] in 1982 and can be used to evaluate the effect of both structured and unstructured uncertainties on closed loop system performance. A summary of the mu-synthesis approach is provided here.

Figure 1:
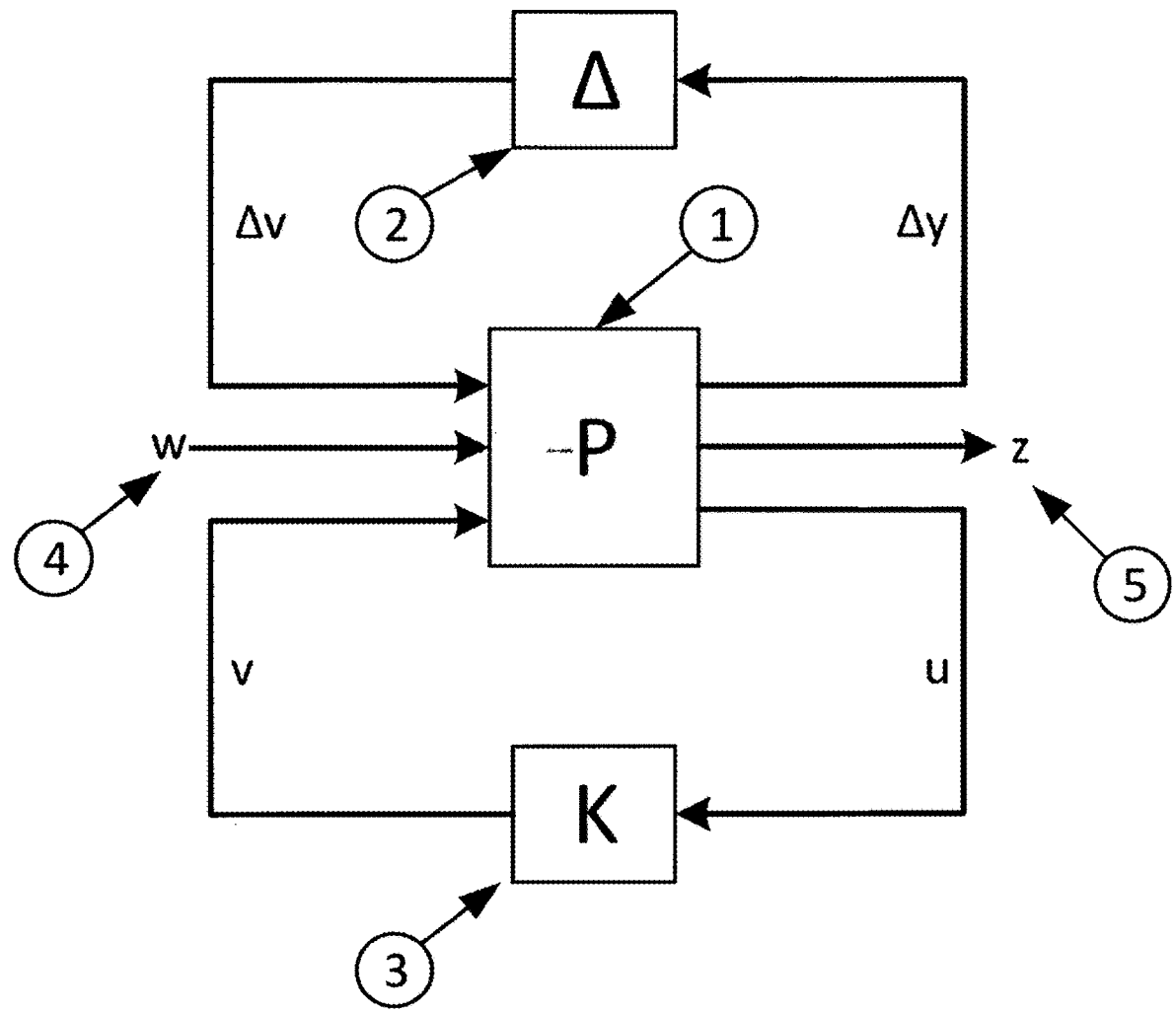
FIG. 1 is a block diagram showing the plant (P), controller (K), and uncertainty parameter ($\Delta$)

For the general plant (1) and controller (3) configuration shown in FIG. 1, P(s) (1) is the generalized plant model, K(s) (3) is a stabilizing controller, and Δ (2) is a matrix containing all plant uncertainties. P(s) (1) is considered to be a linear, time invariant system. For the purposes of this disclosure, Δ (2) is considered to be block-diagonal, and K(s) (3) to be strictly proper. Δ (2) has the form, $$\Delta_{n \times n} = \{\text{diag}(\Delta_i) : \Delta_i \in C, i=1,2,3 \ldots n\} \quad (1)$$

where each $\Delta_i$ resides in the complex set, and is a source of the $i^{th}$ uncertainty (input, output, or parametric). It is assumed that Δ (2) is stable. Given the block structure of Δ (2) in (1), Δ (2) is normalized such that $$\overline{\sigma}(\Delta_i(j\omega)) \leq 1 \forall \omega, \forall i \Leftrightarrow \|\Delta\|_\infty \leq 1 \quad (2)$$

Here $\overline{\sigma}(\cdot)$ is the largest singular value operator. While the condition in (2) may not always hold for all i, for this disclosure, only a subset of $\Delta_{n \times n}$ (2) is considered such that both (1) and (2) are satisfied. In the broader sense, it is possible to work with a structure for $\Delta_{n \times n}$ (2) where some of the $\Delta_i$s are block diagonal, and some others are not. For a given controller K(s) (3), the system in FIG. 2 can be consolidated as shown.

Here, $$N(s) = \mathcal{F}(P(s), K(s)) \triangleq P_{11}(s) + P_{12}(s)K(s)(I - P_{22}(s)K(s))^{-1}P_{21}(s) \quad (3)$$

Figure 2:
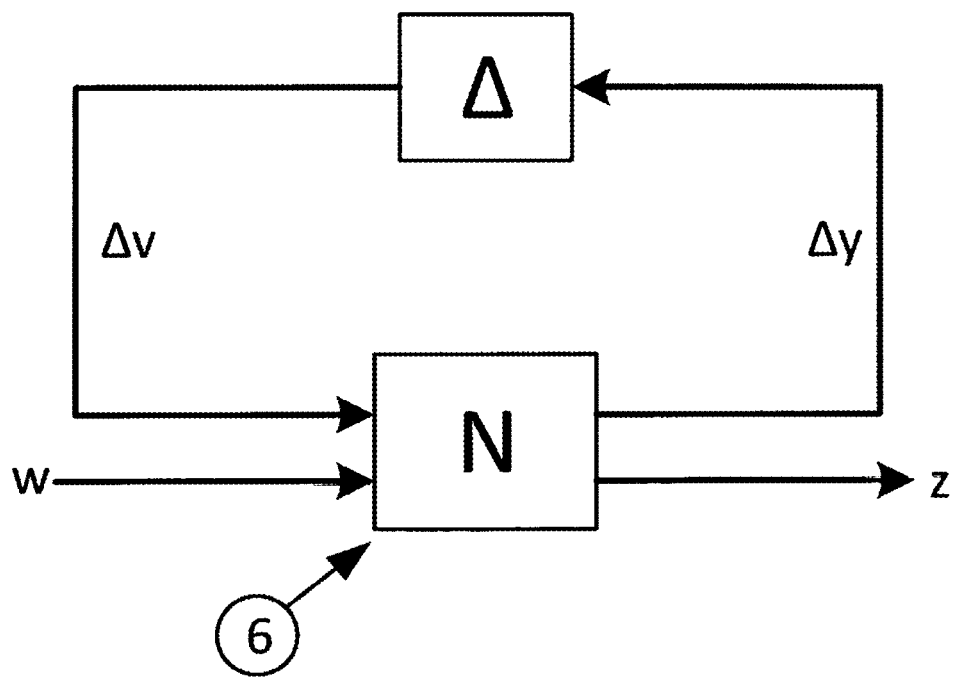
FIG. 2 is a block diagram showing the N-$\Delta$ structure used for robust performance analysis

In FIG. 2, closed loop stability from inputs (w) (4) to outputs (z) (5) can be analyzed using the linear fractional transformation, $$F(s) = \mathcal{F}(N(s), \Delta) \triangleq N_{22}(s) + N_{21}(s)\Delta(I - N_{11}(s)\Delta)^{-1}N_{12}(s) \quad (4)$$

Here each parameter of the form $X_{ij}$ represents a block from the decomposition of the matrix X ($X \in R^{n_i \times n_i}$). Next, to perform robust stability analysis, matrix C(s) (7) is defined such that $C(s) = N_{11}(s)$ (transfer function from the output to the input of Δ (2)). It is assumed that C(s) (7) is stable. Lastly, function mu(°) is defined as, $$mu(C(s)) = [\min\{\overline{\sigma}(\Delta_i) : \det(I - C(s)\Delta) = 0\}]^{-1} \quad (5)$$

Figure 3:
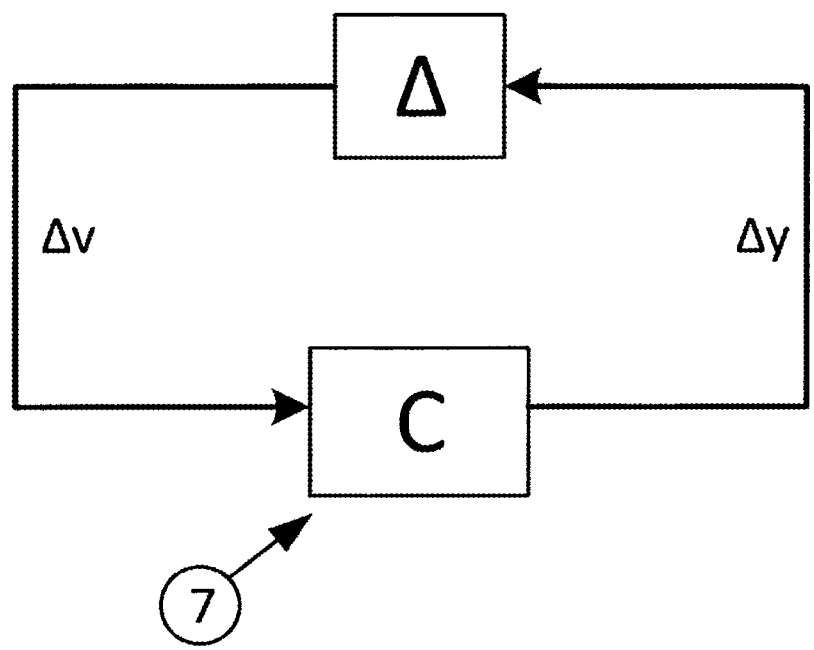
FIG. 3 is a block diagram showing the C-$\Delta$ structure used for robust stability analysis

Here mu(C(s)) is the structured singular value of C(s) (7), measuring the smallest structured uncertainty Δ (2) that renders the feedback loop shown in FIG. 3 unstable. The mu-synthesis robust control framework is centered on the parameterization of the largest disturbance that a system can withstand, while maintaining robust stability.

The conditions for robust stability are $$(i) N(s)(6) \text{ is stable} \quad (6)$$

$$(ii) mu(C(s)) < 1 \forall s \quad (7)$$

The conditions for robust performance are $$(i) \text{robust stability} \quad (8)$$

$$(ii) mu(N(s)) < 1 \forall s \quad (9)$$

2. Internal Model Principle

Figure 4:
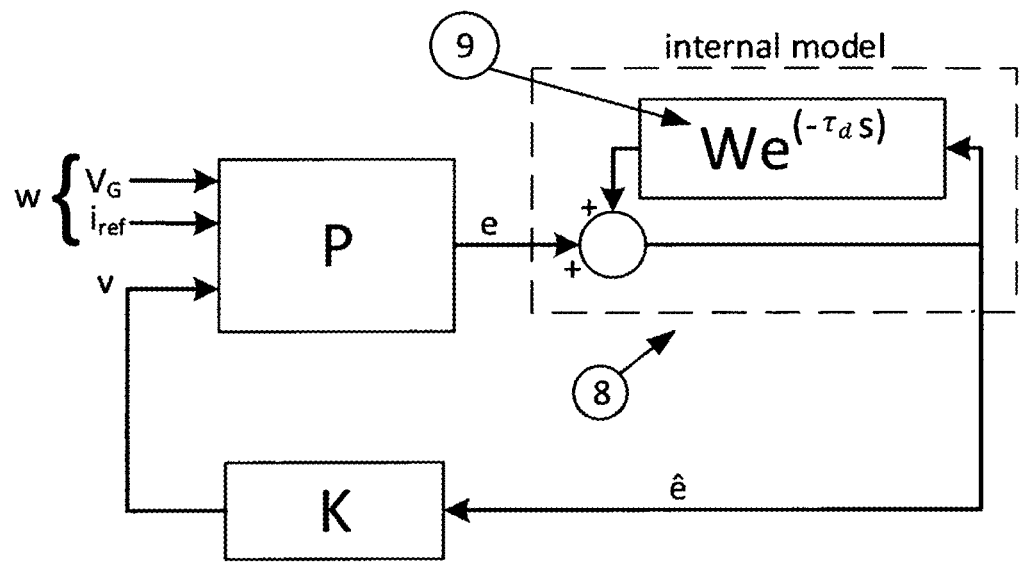
FIG. 4 is a block diagram showing the placement of internal model (M)

One of the steps in current controller operation is the transformation of three phase signals to their direct-quadrature (dq) equivalent. With the use of the repetitive control strategy, the dq transformation step is no longer required. The repetitive control strategy is implemented via the internal model principle. Internal model principle was first proposed in document [9]. It has important applications in the power systems domain, especially in systems that require reference tracking of sinusoidal signals, and/or harmonic rejection of periodic signals with known frequencies. FIG. 4 shows a general structure for the internal model design process. Internal model M(s) (8) has the form, $$M(s) = \frac{1}{1 - W(s)e^{-\tau_d s}} \quad (10)$$

W(s) (9) is chosen based on the conditions for robust stability specified in document [10], (i) $|W(\infty)| = 0$, and (ii) $|W(j\omega)|$ close to 1 $\forall \omega \in [0, \omega_c]$. Here $[0, \omega_c]$ is the frequency range of interest. Based on conditions (i) and (ii), W(s) is chosen as a low pass filter with cut-off frequency $\omega_c = 290$ Hz, $\tau_d = 16.11$ ms.

$$W(s) \equiv \left[\begin{array}{c|c} A_w & B_w \\ \hline C_w & D_w \end{array}\right] = \left[\begin{array}{c|c} -1818 & 1818 \\ 1 & 0 \end{array}\right] \quad (11)$$

3. Inverter Model

Figure 5:
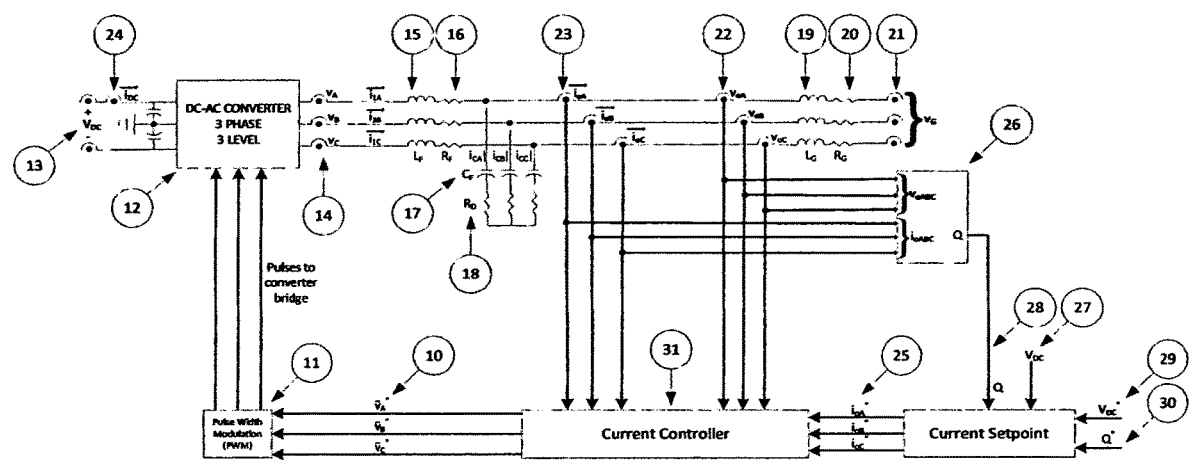
FIG. 5 is a circuit diagram for a three-phase inverter

The inverter model considered here consists of a pulse width modulation (PWM) block (11), inverter bridge (12), an LC-filter (15, 16, 17, 18), and a grid interface inductor and resistor (19, 20), as shown in FIG. 5. The following vector definitions are required for this section, $x_p = [i_{1A} \ i_{oA} \ V_c]^T$, $w = [V_G \ i_{ref}]^T$ (4), and $y_p = e_{iref} = (i_{ref} - i_{oA})$. The PWM block is designed such that for $$|\tilde{v}_A(t)| \leq \frac{V_{DC}}{2},$$

the local average of the bridge output voltage $V_A$ (14) equals v. The PWM (11) and inverter bridge (12) are considered as a saturated unity gain ($k_{PWM} = 1$), where the saturation models the limit of the available dc-link voltage (13) with respect to the neutral line $$\left[\frac{V_{DC}}{2}\right].$$

Based on these definitions, and replacing $V_A$ (14) with v (40), a state space representation of the inverter is written as $$\dot{x}_p = A x_p + B_1 w + B_2 v \quad (12)$$
$$y_p = C_1 x_p + D_1 w + D_2 v$$

where, $$A = \begin{bmatrix} -\frac{(R_F+R_D)}{L_F} & \frac{R_D}{L_F} & -\frac{1}{L_F} \\ \frac{R_D}{L_G} & -\frac{(R_G+R_D)}{L_G} & \frac{1}{L_G} \\ \frac{1}{C_F} & -\frac{1}{C_F} & 0 \end{bmatrix}$$

$$B_1 = \begin{bmatrix} 0 & 0 \\ -\frac{1}{L_G} & 0 \\ 0 & 0 \end{bmatrix} \quad B_2 = \begin{bmatrix} \frac{k_{PWM}}{L_F} \\ 0 \\ 0 \end{bmatrix}$$

$$C_1 = [0\ -1\ 0]\ D_1 = [0\ 1]\ D_2 = [0] \quad (13)$$

A processing delay term ($W_d$) (37) is added at the output of the controller (K) (3). This block represents hardware delays that exist in a real system. With simulation period Ts=1μs, $$W_d(s) \equiv \begin{bmatrix} A_d & B_d \\ C_d & D_d \end{bmatrix} = \begin{bmatrix} -3*10^6 & 6*10^6 \\ 1 & -1 \end{bmatrix} \quad (14)$$

Figure 6:
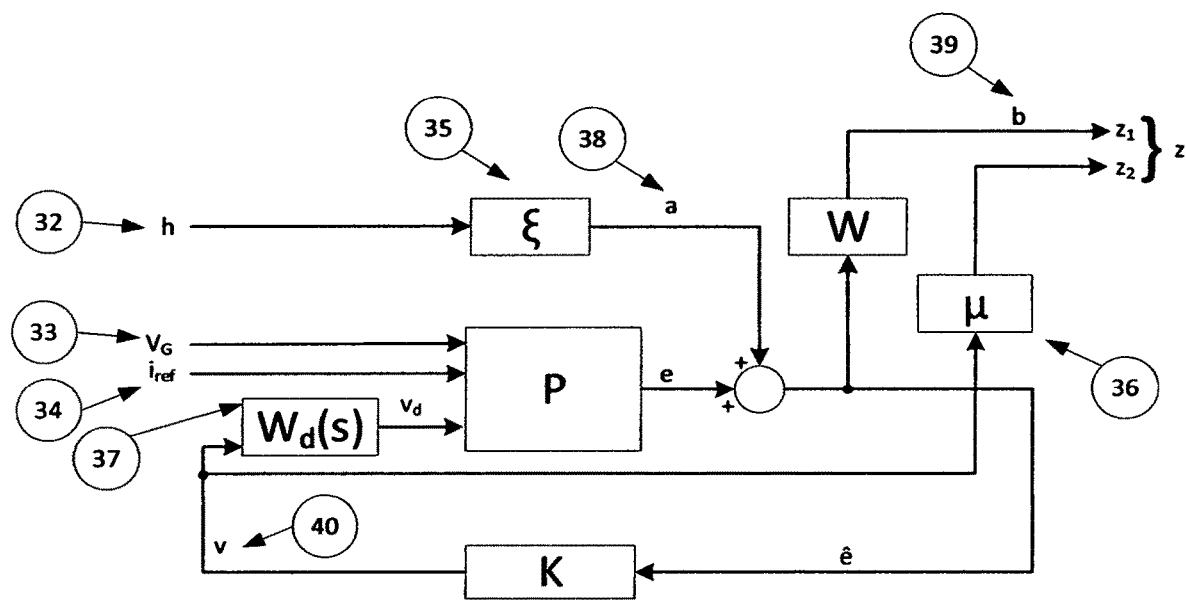
FIG. 6 is a block diagram showing the robust control standard form with input uncertainty in the plant

FIG. 6 shows the robust control standard form for a plant-controller system with input uncertainty in the plant (1). Tuning parameters ξ (35) and μ (36) are available for freedom of design to obtain optimal controller performance, and h (32) is the disturbance signal.

Based on the expressions for P(s) (1), W(s) (9), and $W_d$(s) (37), an expression for the extended plant $\acute{P}$(s) is provided in equation 15. This is needed to design controller K(s) (3).

$$\acute{P} \equiv \begin{bmatrix} A & B_2 C_d & 0 & 0 & B_1 & B_2 D_d \\ 0 & A_d & 0 & 0 & 0 & B_d \\ B_w C_1 & B_w D_2 C_d & A_w & B_w \xi & B_w D_1 & B_2 D_2 D_d \\ \hline D_w C_1 & D_w D_2 C_d & C_w & D_w \xi & D_w D_1 & D_w D_2 D_d \\ 0 & 0 & 0 & 0 & 0 & \mu \\ C_1 & D_2 C_d & 0 & \xi & D_1 & D_2 D_d \end{bmatrix} \quad (15)$$

Here $\acute{P}$ defines the relationship from $[h\ w\ v]^T$ to $[z_1\ z_2\ \hat{e}]^T$.

According to document [10], a test for stability of any controller K (3) designed using the robust control process described in Section 1. is to check whether $\|S_{ba}\|_\infty < 1$. Here $S_{ba}$ is the system describing the relationship from post-weighed disturbance a (38) to post-weighed tracking error measurement b (39) (refer to FIG. 6). The goal here is to ensure that bounded periodic disturbances ($h \in L_2[0,\infty)$) will not disrupt the tracking objective. The closed loop system in FIG. 6 is exponentially stable if the closed loop system in FIG. 4 is stable and $\|S_{ba}\|_\infty < 1$.

$$S_{ba} = \begin{bmatrix} A & B_2 C_d & B_2 D_d C_k & 0 & 0 \\ 0 & A_d & B_d C_k & 0 & 0 \\ B_k C_1 & B_k D_2 C_d & A_k + B_k D_2 D_d C_k & B_k C_w & 0 \\ 0 & 0 & 0 & A_w & B_w \\ \hline C_1 & D_2 C_d & D_2 D_d C_k & C_w & 0 \end{bmatrix} \quad (16)$$

The mu-synthesis design problem involves the determination of a mu-controller K(s) (3), given a plant P(s) (1) that contains uncertain parameter(s). Since there is no direct method to determine K(s) (3), this disclosure employs the use of an iteration-based algorithm, also known as D-K iteration. The algorithm involves minimization of mu(N(s)) and mu(C(s)) (as described in [10]). N(s) (6) is scaled using a rational and stable transfer function D(s) so that N'(s)=D(s)N(s)D(s)$^{-1}$, where N(s) (6) is a function of the controller K(s) (3). The D-K algorithm first involves the determination of an initial K(s) (3) by solving the algebraic Riccati equations related to the standard optimal problem, as described in document [8]. Next, values are determined for D(jω) that mu(N'(jω)) at each ω $\{\omega \in [\omega_1, \omega_u]\}$ with a fixed N'(s). Lastly, a new rational and stable transfer function expression for D(s) is determined by fitting the magnitude of each element of D(jω) (from the previous step) to form such an expression. The iteration process continues until satisfactory performance is achieved (when mu-bounds mu(N(s)) <1 and mu(C(s))<1), or until both mu-bounds stop decreasing. In the iteration process, the determination of K(s) (3) and D(s) are convex problems by themselves, but joint convexity is not guaranteed [8]. Hence the algorithm may not always converge to a global optimum.

Under the formulation of linear fractional transformation, uncertainty in the input DC voltage (13) is considered and expressed as a static uncertainty. Mu-synthesis based control is chosen to attain robust reference tracking in the presence of plant uncertainties (2). The repetitive control strategy is chosen because it can reject a large number of harmonics simultaneously, while providing a clean sinusoidal current waveform to the grid, even in the presence of grid load and/or voltage distortions. In this invention, the repetitive control strategy is implemented via the internal model principle. By applying mu-synthesis principles, a feedback controller that simultaneously achieves robust stability and robust tracking performance is obtained.

What is claimed is:

1. A control system for a power inverter, where the power inverter is configured to supply power to a load, and the control system for the power inverter comprising:
    a plurality of output voltage sensors (22), and plurality of output current sensors (23) configured to measure output AC voltages and output AC currents of the power inverter;
    an input voltage sensor (13) and input current sensor (24), configured to measure input DC voltage and input DC current of the power inverter;
    a controller coupled to the power inverter, and being configured to:
        provide a control signal associated with a DC voltage reference (29), and a reactive power reference (30) to the power inverter;
        determine a target amplitude and target frequency for the AC output voltage (22) and AC output current (23) of the power inverter;
        apply a low pass filter (15, 16, 17,18) to the output power of the power inverter, where the low pass band of the filter is determined based on a target amplitude and a target frequency of the output voltage (22) and output current (23).

2. The control system of claim 1, wherein the controller is further configured to:
generate a plurality of power transistor switching pulses for the power inverter based on a target amplitude and a target frequency of the AC output voltage (22) and output current (23);
provide switching pulses to the power transistors of the power inverter;
applying a low pass filter to the output power of the inverter.

3. The control system of claim 2, where the control system is further configured to:
determine an output active power of the power inverter based on the input DC power provided to the power inverter by the DC power source, if the power source is a solar power source;
determine an output reactive power of the power inverter based on an external reference provided by an operator, if the DC power source is a solar power source;
determine the output active power of the power inverter based on an external reference provided by the operator, if the DC power source is an electro-chemical energy storage power source;
determine the output reactive power of the power inverter based on an external reference provided by the operator, if the DC power source is an electro-chemical energy storage power source;
calculate the output active power based on the AC output voltage (22) and AC output current (23) sensor measurements;
match the output active power with an operator-provided DC voltage (29) reference using a feedback control loop;
calculate the output reactive power based on the AC output voltage (22) and AC output current (23) sensor measurements;
match the output reactive power with the reactive power reference using a feedback control loop.

* * * * *